US009097947B2

(12) United States Patent
Yamazaki et al.

(10) Patent No.: US 9,097,947 B2
(45) Date of Patent: Aug. 4, 2015

(54) DISPLAY DEVICE AND MANUFACTURING METHOD THEREOF

(75) Inventors: Shunpei Yamazaki, Setagaya (JP); Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 231 days.

(21) Appl. No.: 13/461,809

(22) Filed: May 2, 2012

(65) Prior Publication Data

US 2012/0287359 A1  Nov. 15, 2012

(30) Foreign Application Priority Data

May 12, 2011 (JP) ................. 2011-107031

(51) Int. Cl.
G02F 1/1343 (2006.01)
G02F 1/1347 (2006.01)
H04N 13/04 (2006.01)
G02B 27/22 (2006.01)

(52) U.S. Cl.
CPC .......... G02F 1/1347 (2013.01); G02B 27/2214 (2013.01); G02B 27/2264 (2013.01); H04N 13/0409 (2013.01); H04N 13/0413 (2013.01)

(58) Field of Classification Search
CPC .............. G02F 1/1347; G02B 27/2264; G02B 27/2214; H04N 13/0409; H04N 13/0413
USPC ...................................... 349/15, 193
See application file for complete search history.

(56) References Cited

U.S. PATENT DOCUMENTS

| 6,160,600 | A | 12/2000 | Yamazaki et al. | |
|---|---|---|---|---|
| 6,842,211 | B2 | 1/2005 | Katsura | |
| 6,844,910 | B2 | 1/2005 | Katsura | |
| 7,679,710 | B2 | 3/2010 | Katsura | |
| 7,804,552 | B2 | 9/2010 | Yamazaki et al. | |
| 8,648,995 | B2 | 2/2014 | Katsura | |
| 2007/0046564 | A1* | 3/2007 | Kim et al. | 345/6 |
| 2007/0146233 | A1* | 6/2007 | Lee et al. | 345/6 |
| 2008/0157136 | A1 | 7/2008 | Matsumoto et al. | |
| 2009/0224646 | A1* | 9/2009 | Kim et al. | 313/245 |
| 2009/0225243 | A1* | 9/2009 | Kim et al. | 349/15 |
| 2010/0110316 | A1* | 5/2010 | Huang et al. | 349/15 |

(Continued)

FOREIGN PATENT DOCUMENTS

JP  2005-258013  9/2005

*Primary Examiner* — Michael Caley
(74) *Attorney, Agent, or Firm* — Eric J. Robinson; Robinson Intellectual Property Law Office, P.C.

(57) ABSTRACT

A display device includes a display panel and a shutter panel provided on a viewable side of the display panel. The shutter panel includes a plurality of first transparent electrodes provided over a first substrate, a plurality of second transparent electrodes provided over a second substrate, and a liquid crystal provided between the first substrate and the second substrate. The first transparent electrodes and the second transparent electrodes are arranged in striped patterns in a first direction and are both spaced in a second direction intersecting the first direction. Potentials of the first transparent electrodes and potentials of the second transparent electrodes are controlled to adjust an alignment of the liquid crystal, so that the shutter panel is provided with light-shielding regions arranged in a striped pattern in the first direction and spaced in the second direction and light-transmitting regions each of which is provided between the light-shielding regions.

15 Claims, 6 Drawing Sheets

(56) References Cited

U.S. PATENT DOCUMENTS

| | | |
|---|---|---|
| 2011/0043713 A1* | 2/2011 | Nam et al. ............ 349/15 |
| 2011/0248266 A1 | 10/2011 | Miyake et al. |
| 2012/0019733 A1* | 1/2012 | Kim et al. ............ 349/15 |
| 2012/0062539 A1 | 3/2012 | Koyama |
| 2012/0062561 A1 | 3/2012 | Koyama |

* cited by examiner

DISPLAY DEVICE AND MANUFACTURING METHOD THEREOF

BACKGROUND OF THE INVENTION

1. Field of the Invention

The present invention relates to a display device. In particular, the present invention relates to a display device capable of displaying a three-dimensional (3D) image.

2. Description of the Related Art

Display devices are widely used, ranging from a large display device such as a television device to a small display device such as a mobile phone. High value-added products will be needed and are being developed. In recent years, display devices that can display 3D images have been developed in order to display more realistic images.

As methods for displaying a 3D image, there are a method using glasses for separating an image seen with a left eye and an image seen with a right eye (also referred to as an image separation method), and an autostereoscopic method by which a 3D image can be seen with the naked eye by addition of a structure for separating an image seen with a left eye and an image seen with a right eye in a display portion. It is not necessary to prepare glasses to perceive a 3D image when the autostereoscopic method is employed, which offers a high convenience. The 3D image display using the autostereoscopic method has been gradually spreading to a mobile phone, a mobile game console, and the like.

As a method for displaying a 3D image using the autostereoscopic method, there is known a parallax barrier method in which a parallax barrier is added to a display portion. A parallax barrier for this method is a stripe-shaped light-shielding portion and causes a decrease in resolution when display is switched from 3D display to two-dimensional (2D) display. In view of this, for a parallax barrier method, there is suggested a structure in which a liquid crystal panel having a patterned transparent electrode is used, and when display is switched between 2D display and 3D display, transmission or shielding of light by a liquid crystal layer is controlled by adjusting voltage applied to the transparent electrode in order that the presence or absence of a parallax barrier is set (see Patent Document 1).

REFERENCE

[Patent Document 1] Japanese Published Patent Application No. 2005-258013

SUMMARY OF THE INVENTION

However, in order to display a 3D image by a parallax barrier method, a specific distance is needed between a display screen and the eye of a viewer.

In the view of above, it is an object of one embodiment of the present invention to provide a display device which displays a 3D image using an autostereoscopic method and has the extended distance (between a display screen and the eye of a viewer) with which the viewer can perceive a 3D image with the naked eye.

A display device according to one embodiment of the present invention includes a display panel and a shutter panel provided on a viewable side of the display panel. The shutter panel includes a first substrate, a plurality of first transparent electrodes provided over the first substrate, a second substrate which faces the first substrate, a plurality of second transparent electrodes provided over the second substrate, and a liquid crystal provided between the first substrate and the second substrate. The first transparent electrodes are arranged in a striped pattern in a first direction and spaced in a second direction which intersects the first direction. The second transparent electrodes are arranged in a striped pattern in the first direction and spaced in the second direction which intersects the first direction. Potentials of the first transparent electrodes and potentials of the second transparent electrodes are controlled to adjust an alignment of the liquid crystal, so that the shutter panel is provided with the light-shielding regions which are arranged in a striped pattern in the first direction and spaced in the second direction and light-transmitting regions each of which is provided between the light-shielding regions.

That is, widths of and a space between the light-shielding regions in the second direction and widths of and a space between the light-transmitting regions in the second direction can be variable. In other words, widths of and a space between parallax barriers can be variable. Here, for example, a distance between a display screen and a viewer is measured by a sensor or the like, and potentials of the first transparent electrodes and potentials of the second transparent electrodes are controlled in response to the distance to control the widths of and the space between the parallax barriers. In this manner, the widths of and the space between the parallax barriers are controlled in response to a distance between the display screen and the viewer, so that the viewer can perceive a 3D image.

In a direction perpendicular to the first substrate or the second substrate, a space between the first transparent electrodes may overlap with the plurality of second transparent electrode and a space between the second transparent electrodes may overlap with the first transparent electrode.

A potential may be applied to each of the first transparent electrodes through a corresponding first transistor and a potential may be applied to each of the second transparent electrodes through a corresponding second transistor.

For the liquid crystal, a known liquid crystal material can be freely used. Further, a known alignment mode can be freely applied to an alignment of the liquid crystal. For example, a twisted nematic (TN) mode, a super twisted nematic (STN) mode, a vertical alignment (VA) mode, an optically compensated bend/optically compensated birefringence (OCB) mode, or the like can be used. Note that a polymer dispersed liquid crystal may also be used. The shutter panel may further include an alignment film or a polarizing filter depending on an alignment mode.

For the display panel, any of known display panels having a variety of structures can be used. For example, a display panel including a light-emitting element such as an electroluminescence element (hereinafter, referred to as an EL element) may be used. A display panel including a liquid crystal element may also be used.

(Method for Driving Shutter Panel)
(Normally White Mode)

A first control signal is applied to a plurality of first transparent electrodes which forms a plurality of light-shielding regions and a second control signal is applied to a plurality of second transparent electrodes which forms the plurality of light-shielding regions. Each of the first control signal and the second control signal is a signal which alternates between a high potential and a low potential at regular intervals. One control signal can be a high potential while the other control signal is a low potential.

Further, a third control signal can be applied to a plurality of first transparent electrodes which forms a light-transmitting region and a fourth control signal may be applied to a plurality of second transparent electrodes which forms the light-transmitting region. The third control signal and the fourth control signal may be a same signal. Note that both of the third control signal and the fourth control signal may be 0 V.

(Normally Black Mode)

A first control signal is applied to a plurality of first transparent electrodes which forms a plurality of light-transmitting regions and a second control signal is applied to a plurality of second transparent electrodes which forms the plurality of light-transmitting regions. Each of the first control signal and the second control signal is a signal which alternates between a high potential and a low potential at regular intervals. One control signal can be a high potential while the other control signal is a low potential.

Further, a third control signal can be applied to a plurality of first transparent electrodes which forms a light-shielding region and a fourth control signal may be applied to a plurality of second transparent electrodes which forms the light-shielding region. The third control signal and the fourth control signal may be a same signal. Note that both of the third control signal and the fourth control signal may be 0 V.

In other words, the above driving method is a driving method (hereinafter, also referred to as an inversion driving method in which in a predetermined region (the light-shielding region in the normally white mode) or the light-transmitting region in the normally black mode), both of a potential of the first transparent electrode and a potential of the second transparent electrode are changed at regular intervals and controlled to have a predetermined potential difference so that an inverted electric field is applied to a liquid crystal provided between those transparent electrodes at regular intervals.

In a display device according to one embodiment of the present invention, widths of and a space between parallax barriers can be variable, so that the range of distance with which a viewer can perceive a 3D image with a naked eye can be extended. Thus, a highly convenient display device can be provided.

Further, when the above inverted driving method is employed to the shutter panel, deterioration of the liquid crystal can be prevented. In a predetermined region (the light-shielding region in the normally white mode or the light-transmitting region in the normally black mode), each of the first control signal applied to the first transparent electrode and the second control signal applied to the second transparent electrode is a signal which alternates between a high potential and a low potential at regular intervals. One control signal is a high potential while the other control signal is a low potential. Thus, the amplitude of the potential of the first transparent electrode (amplitude of the first control signal) and the amplitude of the potential of the second transparent electrode (amplitude of the second control signal) can be smaller than that of a voltage applied to the liquid crystal. Accordingly, a driver circuit which controls the first transparent electrode and the second transparent electrode (which outputs the first control signal and the second control signal) can be operated with a lower power supply voltage. In this manner, power consumption of the shutter panel can be reduced.

A potential is applied to each of the first transparent electrodes through a corresponding first transistor and a potential is applied to each of the second transparent electrodes through a corresponding second transistor; thus, potentials of the first transparent electrodes can be individually controlled and potentials of the second transparent electrodes can be individually controlled. In this manner, the widths of and the space between the parallax barriers can be changed more freely (the range of the widths of the parallax barriers and the range of the space between the parallax barriers can be extended).

In a direction perpendicular to the first substrate or the second substrate, when a space between the first transparent electrodes overlaps with the second transparent electrode and a space between the second transparent electrodes overlaps with the first transparent electrode, light leakage from the light-shielding region in the normally white mode can be reduced.

DETAILED DESCRIPTION OF THE INVENTION

Hereinafter, embodiments and an example of the present invention will be described below with reference to the drawings. Note that the present invention can be implemented in various different ways. It will be readily appreciated by those skilled in the art that modes of the present invention can be modified in various ways without departing from the spirit and scope of the present invention. The present invention therefore should not be construed as being limited to the description of the embodiments and example. Note that in structures of the present invention described below, reference numerals denoting the same portions are used in common in different drawings.

Note that the size, layer thickness, area, or the like of each component may be exaggerated for clarity in drawings and the like in the embodiments, and thus is not limited to such scales.

Note that in this specification and the like, the terms "first", "second", "third", to "N-th" (N is a natural number) are used in order to avoid confusion among components and do not limit the number of components. The natural number is 1 or more unless otherwise specified.

(Embodiment 1)

First, a display device according to one embodiment of the present invention will be described with reference to FIGS. 1A to 1C and FIGS. 4A to 4D.

Figure 1A:
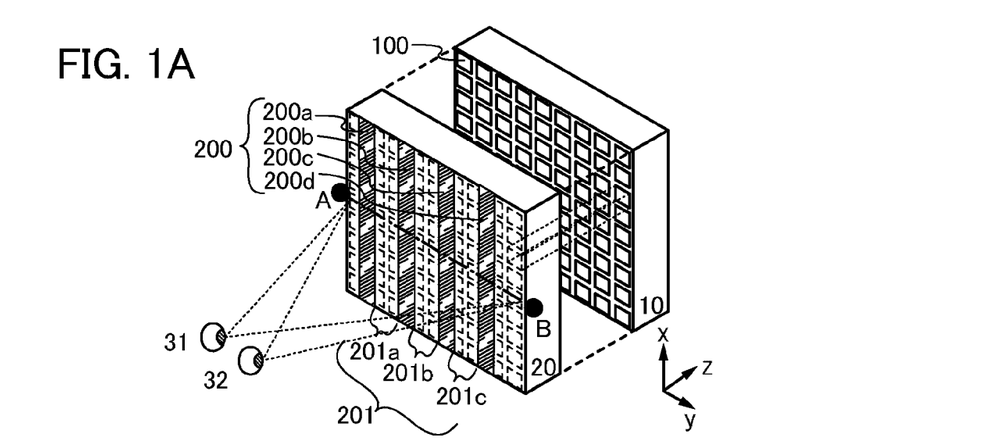
FIGS. 1A to 1C are schematic diagrams of a display device.
Figure 1B:
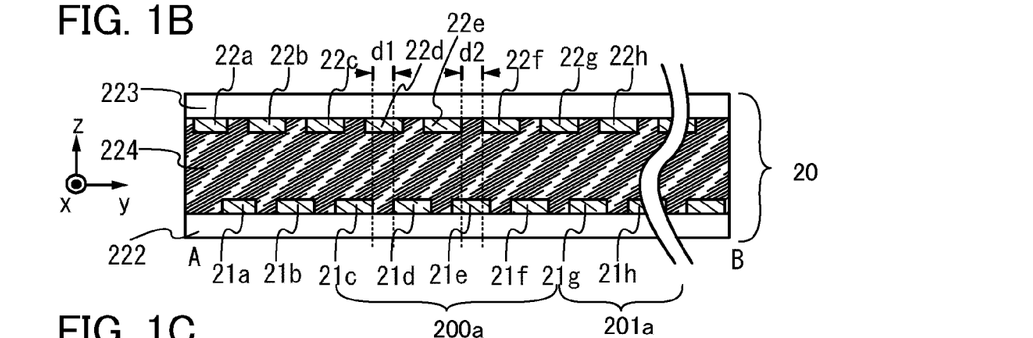

FIGS. 1A and 1B are schematic diagrams each illustrating a display device according to one embodiment of the present invention. The display device illustrated in FIG. 1A includes a display panel 10 in which a plurality of pixels 100 is arranged in a matrix, and a shutter panel 20. FIG. 1A illustrates a left eye 31 and a right eye 32 of a viewer in order to show a state of the viewer's perception.

Note that the shutter panel 20 is provided in a direction where light is emitted from the display panel 10, that is, on the side viewed by the viewer of the display device. The shutter panel 20 may include a light-shielding region 200a, a light-shielding region 200b, a light-shielding region 200c, and a light-shielding region 200d (hereinafter, collectively referred to as a plurality of light-shielding regions 200) and a light-transmitting region 201a, a light-transmitting region 201b, and a light-transmitting region 201c (hereinafter, collectively referred to as a plurality of light-transmitting regions 201) provided between the light-shielding region 200a and the light-shielding region 200b, the light-shielding region 200b and the light-shielding region 200c, and the light-shielding region 200c and the light-shielding region 200d, respectively. The plurality of light-shielding regions 200 shields part of light emitted from the display panel 10. The plurality of light-transmitting regions 201 transmits the light emitted from the display panel 10. That is, the plurality of light-shielding regions 200 functions as parallax barriers.

Figure 1C:
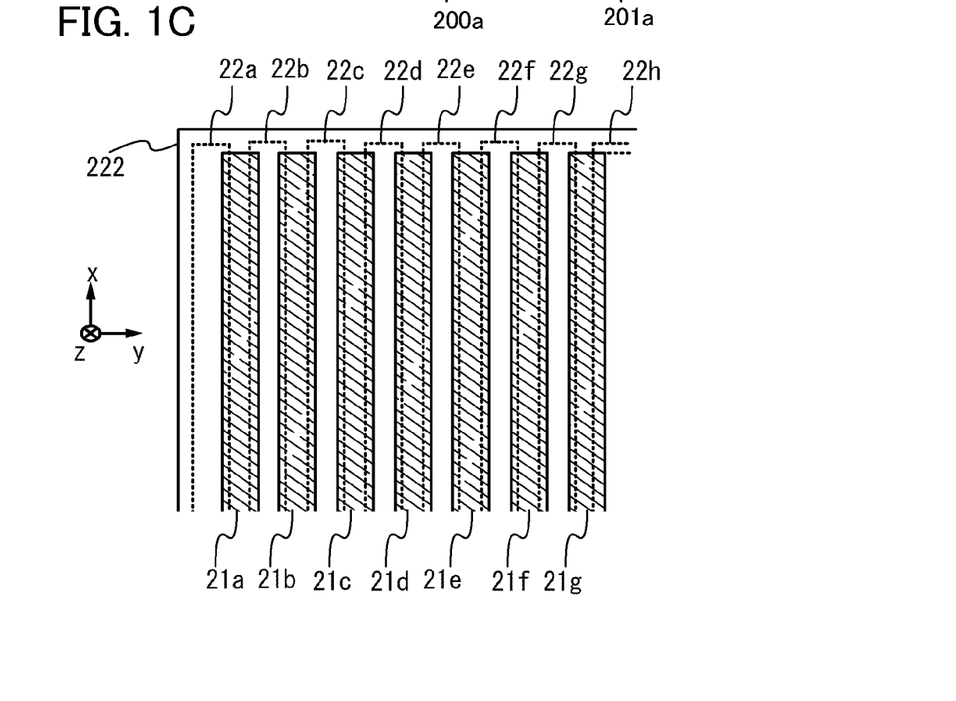

FIGS. 1B and 1C are diagrams illustrating a detailed structure of the shutter panel 20 of the display device illustrated in FIG. 1A. FIG. 1B illustrates a y-z plane of FIG. 1A and FIG. 1C illustrates a part of an x-y plane of FIG. 1A.

In FIGS. 1B and 1C, the shutter panel 20 includes a substrate 222; a transparent electrode 21a, a transparent electrode 21b, a transparent electrode 21c, a transparent electrode 21d, a transparent electrode 21e, a transparent electrode 21f, a transparent electrode 21g, and a transparent electrode 21h (hereinafter, those transparent electrodes are collectively referred to as a plurality of first transparent electrodes 21) provided over the substrate 222; a substrate 223 which faces the substrate 222; a transparent electrode 22a, a transparent electrode 22b, a transparent electrode 22c, a transparent electrode 22d, a transparent electrode 22e, a transparent electrode 22f, a transparent electrode 22g, and a transparent electrode 22h (hereinafter, those transparent electrodes are collectively referred to as a plurality of second transparent electrodes 22) provided over the substrate 223; and a liquid crystal 224 provided between the substrate 222 and the substrate 223. Note that the substrate 223 is omitted in FIG. 1C to facilitate understanding.

The plurality of first transparent electrodes 21 and the plurality of second transparent electrodes 22 can be formed using a light-transmitting conductive material such as indium tin oxide containing silicon oxide, indium tin oxide, zinc oxide, indium zinc oxide, or zinc oxide to which gallium is added, for example.

The first transparent electrodes 21 are arranged in a striped pattern in an x-direction and spaced in a y-direction which intersects the x-direction.

The second transparent electrodes 22 are arranged in a striped pattern in an x-direction and spaced in a y-direction which intersects the x-direction.

Potentials of the first transparent electrodes 21 and potentials of the second transparent electrodes 22 are controlled to adjust an alignment of the liquid crystal 224. The shutter panel 20 includes the light-shielding regions 200 which are arranged in a striped pattern in the x-direction and spaced in the y-direction, and the light-transmitting regions 201 each of which is provided between the light-shielding regions 200.

That is, widths of and a space between the light-shielding regions 200 in the y-direction and widths of and a space between the light-transmitting regions 201 in the y-direction can be variable. In other words, widths of and a space between the parallax barriers can be variable. Thus, the range of distance with which the viewer can perceive a 3D image with a naked eye can be extended.

Further, in a z-direction in FIGS. 1A to 1C, spaces ("d1" in FIG. 1B) between the first transparent electrodes (the transparent electrode 21a, the transparent electrode 21b, the transparent electrode 21c, the transparent electrode 21d, the transparent electrode 21e, the transparent electrode 21f, the transparent electrode 21g, and the transparent electrode 21h) overlap with the second transparent electrodes (the transparent electrode 22a, the transparent electrode 22b, the transparent electrode 22c, the transparent electrode 22d, the transparent electrode 22e, the transparent electrode 22f, the transparent electrode 22g, and the transparent electrode 22h). In addition, spaces ("d2" in FIG. 1B) between the second transparent electrodes (the transparent electrode 22a, the transparent electrode 22b, the transparent electrode 22c, the transparent electrode 22d, the transparent electrode 22e, the transparent electrode 22f, the transparent electrode 22g, and the transparent electrode 22h) overlap with the first transparent electrodes (the transparent electrode 21a, the transparent electrode 21b, the transparent electrode 21c, the transparent electrode 21d, the transparent electrode 21e, the transparent electrode 21f, the transparent electrode 21g, and the transparent electrode 21h). Accordingly, light leakage from the plurality of light-shielding regions 200 can be reduced.

Here, for the liquid crystal 224, a known liquid crystal material can be freely used. Further, a known alignment mode can be freely applied to an alignment of the liquid crystal 224. For example, a twisted nematic (TN) mode, a super twisted nematic (STN) mode, a vertical alignment (VA) mode, an optically compensated bend/optically compensated birefringence (OCB) mode, or the like can be used. Note that a polymer dispersed liquid crystal may also be used. The shutter panel 20 may further include an alignment film, a polarizing filter, or the like depending on an alignment mode.

For the display panel 10, any of known display panels having a variety of structures can be used. For example, a display panel including a light-emitting element such as an electroluminescence element (EL element) may be used. A display panel including a liquid crystal element may also be used.

(Method for Driving Shutter Panel 20)

Next, a method for driving the shutter panel 20 will be described with reference to FIGS. 4A to 4D.

(Normally White Mode)

Figures 4A, 4B, 4C:
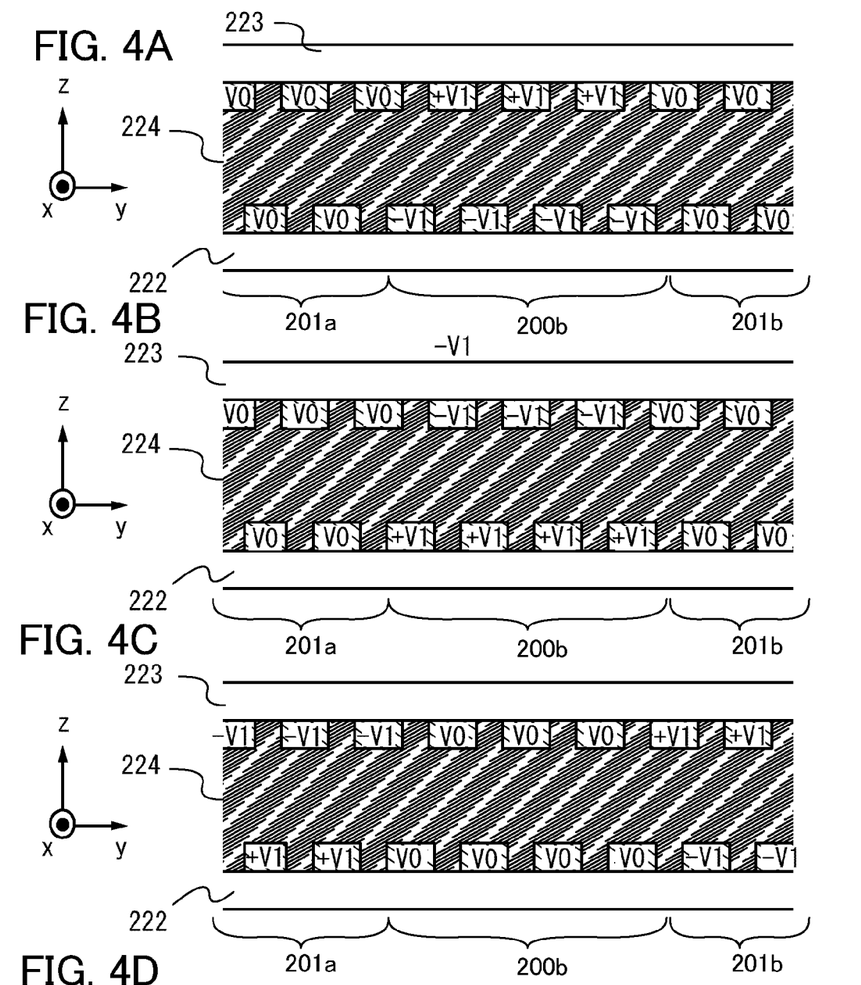
FIGS. 4A to 4D are diagrams illustrating driving methods of a shutter panel.

FIGS. 4A and 4B illustrate an example of a method for driving the shutter panel 20 in the case where a region to which an electric field is applied shields light (normally white mode).

A first control signal is applied to the first transparent electrodes 21 (hereinafter, referred to as transparent electrodes 21i) which forms the plurality of light-shielding regions 200 (the light-shielding region 200b is illustrated as a representative in FIGS. 4A and 4B). A second control signal is applied to the second transparent electrodes 22 (hereinafter, referred to as transparent electrodes 22i) which forms the plurality of light-shielding regions 200. Each of the first control signal and the second control signal is a signal which alternates between a high potential and a low potential at regular intervals. One control signal can be a high potential while the other control signal is a low potential.

For example, in the light-shielding region 200b, a potential −V1 may be applied to the transparent electrodes 21i and a potential +V1 may be applied to the transparent electrodes 22i in one period, as shown in FIG. 4A. In the light-shielding region 200b, a potential +V1 may be applied to the transparent electrodes 21i and a potential −V1 may be applied to the transparent electrodes 22i in another period, as shown in FIG. 4B.

Note that a third control signal may be applied to the first transparent electrodes 21 (hereinafter, referred to as transparent electrodes 21j) which forms the plurality of light-transmitting regions 201 (the light-transmitting region 201a and the light-transmitting region 201b are illustrated as representatives in FIGS. 4A and 4B). A fourth control signal may be applied to the second transparent electrodes 22 (hereinafter, referred to as transparent electrodes 22j) which forms the plurality of light-transmitting regions 201. The third control signal and the fourth control signal may be a same signal. Note that both of the third control signal and the fourth control signal may be 0 V.

For example, in the light-transmitting region 201a and the light-transmitting region 201b, a potential V0 may be applied to the transparent electrodes 21j and a potential V0 may be applied to the transparent electrodes 22j in the one period, as shown in FIG. 4A. In the light-transmitting region 201a and the light-transmitting region 201b, a potential V0 may be applied to the transparent electrodes 21j and a potential V0 may be applied to the transparent electrodes 22j in the another period, as shown in FIG. 4B.

(Normally Black Mode)

Figure 4D:
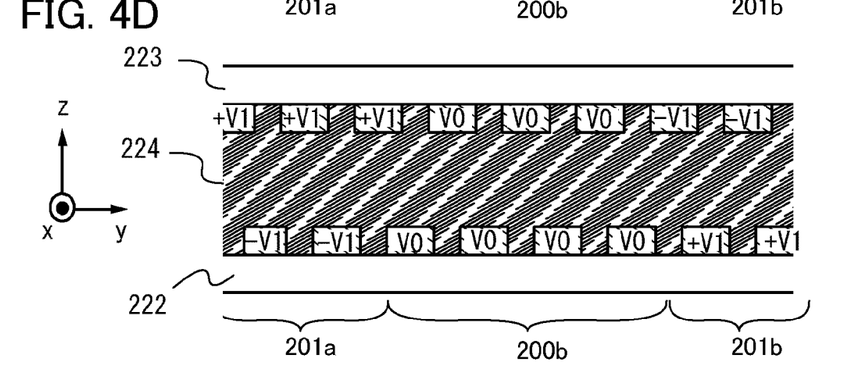

FIGS. 4C and 4D illustrate an example of a method for driving the shutter panel 20 in the case where a region to which an electric field is applied transmits light (normally black mode).

The first control signal is applied to the first transparent electrodes 21 (hereinafter, referred to as transparent electrodes 21i) which forms the plurality of light-transmitting regions 201 (the light-transmitting region 201a and the light-transmitting region 201b are illustrated as representatives in FIGS. 4C and 4D). The second control signal is applied to the second transparent electrodes 22 (hereinafter, referred to as transparent electrodes 22i) which forms the plurality of light-transmitting regions 201. Each of the first control signal and the second control signal is a signal which alternates between a high potential and a low potential at regular intervals. One control signal can be a high potential while the other control signal is a low potential.

For example, in the light-transmitting region 201a, a potential +V1 may be applied to the transparent electrodes 21i and a potential −V1 may be applied to the transparent electrodes 22i in one period, as shown in FIG. 4C. In the light-transmitting region 201b, a potential −V1 may be applied to the transparent electrodes 21i and a potential +V1 may be applied to the transparent electrodes 22i in the one period, as shown in FIG. 4C. On the other hand, in the light-transmitting region 201a, a potential −V1 may be applied to the transparent electrodes 21i and a potential +V1 may be applied to the transparent electrodes 22i in another period, as shown in FIG. 4D. In the light-transmitting region 201b, a potential +V1 may be applied to the transparent electrodes 21i and a potential −V1 may be applied to the transparent electrodes 22i in another period, as shown in FIG. 4D.

Note that the third control signal may be applied to the first transparent electrodes 21 (hereinafter, referred to as transparent electrodes 21j) which forms the plurality of light-shielding regions 200 (the light-shielding region 200b is illustrated as a representative in FIGS. 4C and 4D). The fourth control signal may be applied to the second transparent electrodes 22 (hereinafter, referred to as transparent electrodes 22j) which forms the plurality of light-shielding regions 200. The third control signal and the fourth control signal may be a same signal. Note that both of the third control signal and the fourth control signal may be 0 V.

For example, in the light-shielding region 200b, a potential V0 may be applied to the transparent electrodes 21j and a potential V0 may be applied to the transparent electrodes 22j in the one period, as shown in FIG. 4C. In the light-shielding region 200b, a potential V0 may be applied to the transparent electrodes 21j and a potential V0 may be applied to the transparent electrodes 22j in the another period, as shown in FIG. 4D.

In other words, the above driving method is a driving method (inversion driving method) in which in a predetermined region (the light-shielding region in the normally white mode or the light-transmitting region in the normally black mode), both of a potential of the transparent electrodes 21i and a potential of the transparent electrodes 22i are changed at regular intervals and controlled to have a predetermined potential difference so that an inverted electric field is applied to the liquid crystal 224 provided between those transparent electrodes at regular intervals.

As described above, when the above inverted driving method is employed to the shutter panel 20, deterioration of the liquid crystal 224 can be prevented. In a predetermined region (the light-shielding region in the normally white mode or the light-transmitting region in the normally black mode), each of the first control signal applied to the transparent electrodes 21i and the second control signal applied to the transparent electrodes 22i is a signal which alternates between a high potential and a low potential at regular intervals. One control signal is a high potential while the other control signal is a low potential. Thus, the amplitude of the potential of the transparent electrodes 21i (amplitude of the first control signal: corresponds to twice the absolute value of V1 in FIGS. 4A to 4D) and the amplitude of the potential of the transparent electrodes 22i (amplitude of the second control signal: corresponds to twice the absolute value of V1 in FIGS. 4A to 4D) can be smaller than the amplitude of a voltage applied to the liquid crystal 224 (corresponds to four times the absolute value of V1 in FIGS. 4A to 4D). Accordingly, a driver circuit which controls the plurality of first transparent electrodes 21 and the plurality of second transparent electrodes 22 (which outputs the first control signal and the second control signal) can be operated with a lower power supply voltage. In this manner, power consumption of the shutter panel 20 can be reduced.

This embodiment can be freely combined with any of the other embodiments.

(Embodiment 2)

In this embodiment, a structure in which widths of and the space between the light-shielding regions 200 in the y-direction and widths of and the space between the light-transmitting regions 201 in the y-direction in FIGS. 1A to 1C are variable, so that the range of distance with which the viewer can perceive a 3D image with a naked eye is extended will be described in detail.

Figure 2A:
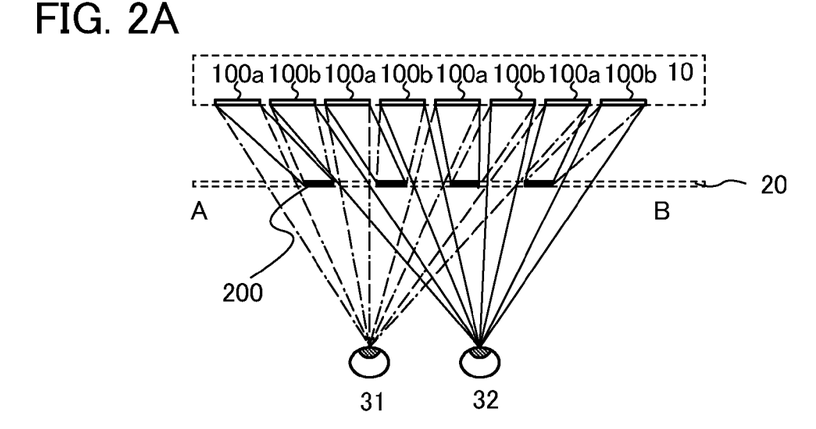
FIGS. 2A to 2C are diagrams each illustrating the relation between a light-shielding region, a display panel, and a viewer.
Figure 2B:
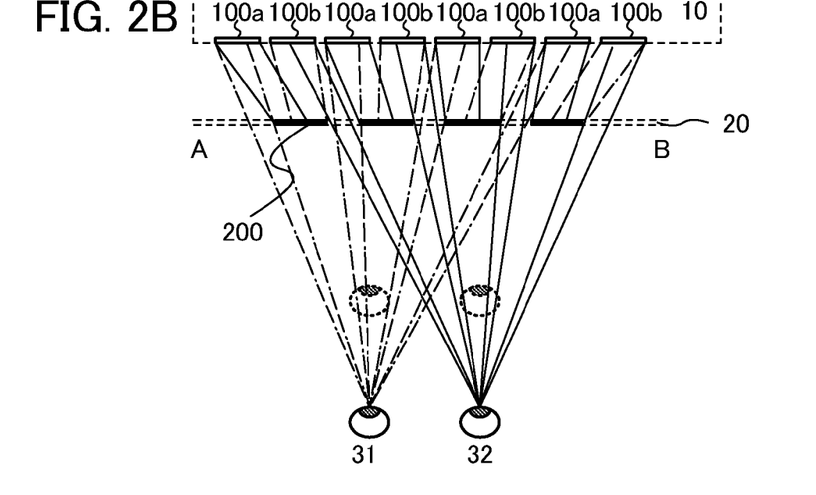
Figure 2C:
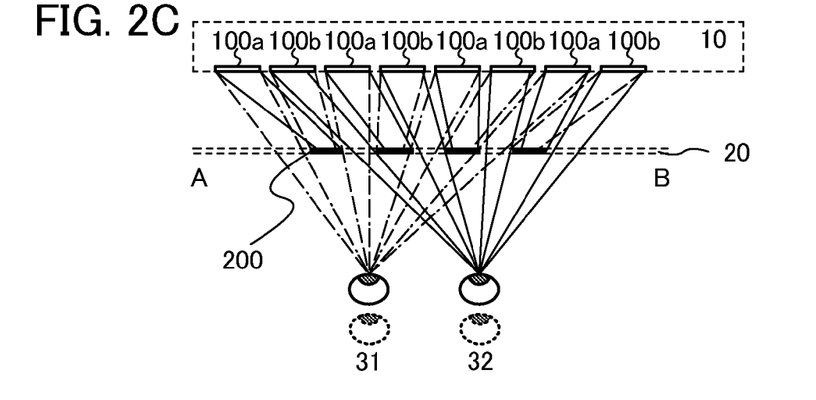

FIGS. 2A to 2C are schematic diagrams each illustrating the structure of the display device along dashed line A-B in FIG. 1A with varying distance between the display panel 10 and the left eye 31 and the right eye 32 of the viewer. Note that with reference to the distance between the display panel 10 and the left eye 31 and the right eye 32 of the viewer in FIG. 2A, FIG. 2B shows the case where the left eye 31 and the right eye 32 of the viewer are farther from the display panel 10, and FIG. 2C shows the case where the left eye 31 and the right eye 32 of the viewer are closer to the display panel 10.

When the viewer looks at the display device from the distance in FIG. 2A, the plurality of light-shielding regions 200 is positioned so that light from pixels 100a is viewed but light from pixels 100b is not viewed with the left eye 31, and the light from the pixels 100b is viewed but the light from the pixels 100a is not viewed with the right eye 32. Accordingly, binocular parallax occurs between the left eye 31 and the right eye 32, whereby the viewer can perceive 3D display.

When the viewer looks at the display device from the distance in FIG. 2B, that is, when the viewer looks at the display device a far distance from the display device, the plurality of light-shielding regions 200 positioned as in FIG. 2A cannot make the left eye 31 and the right eye 32 perceive the light from the pixels 100a and the light from the pixels 100b. In light of this, in the shutter panel 20 including the plurality of light-shielding regions 200 described in this embodiment, the widths of and the space between the light-shielding regions 200 (i.e., the widths of and the space between the parallax barriers) is variable in accordance with a state of the viewer's perception.

In the case of FIG. 2B, the widths of the light-shielding regions 200 are wider than those of the light-shielding regions 200 in the case of FIG. 2A. Thus, also in FIG. 2B, the light from the pixels 100a can be viewed but the light from the pixels 100b cannot be viewed with the left eye 31, and the light from the pixels 100b can be viewed but the light from the pixels 100a cannot be viewed with the right eye 32. Accordingly, binocular parallax occurs between the left eye 31 and the right eye 32 when looking at the display device from a distance, whereby the viewer can perceive 3D display.

When the viewer looks at the display device from the distance in FIG. 2C, that is, when the viewer looks at the display device at a close distance from the display device, the plurality of light-shielding regions 200 positioned as in FIG. 2A cannot make the left eye 31 and the right eye 32 perceive the light from the pixels 100a and the light from the pixels 100b. In light of this, in the shutter panel 20 including the plurality of light-shielding regions 200 described in this embodiment, the widths of and the space between the light-shielding regions 200 (i.e., the widths of and the space between the parallax barriers) is variable in accordance with a state of the viewer's perception.

In the case of FIG. 2C, the widths of the light-shielding regions 200 are wider than those of the light-shielding regions 200 in the case of FIG. 2A. Thus, also in FIG. 2C, the light from the pixels 100a can be viewed but the light from the pixels 100b cannot be viewed with the left eye 31, and the light from the pixels 100b can be viewed but the light from the pixels 100a cannot be viewed with the right eye 32. Accordingly, binocular parallax occurs between the left eye 31 and the right eye 32 when looking at the display device from a distance, whereby the viewer can perceive 3D display.

When a 2D image is displayed, the plurality of light-shielding regions 200 is not provided, so that the light from the pixels 100a and 100b can be viewed with both eyes of the viewer. Consequently, switching between 3D display and 2D display by the shutter panel 20 can be easily performed without decreasing the resolution.

This embodiment can be freely combined with any of the other embodiments.

(Embodiment 3)

In this embodiment, another embodiment of the structures of the plurality of first transparent electrodes 21 and the plurality of second transparent electrodes 22 illustrated in FIGS. 1B and 1C will be described.

Note that a potential may be applied to each of the first transparent electrodes 21 through a corresponding transistor. Such a structure is illustrated in FIGS. 5A and 5B.

Figure 5A:
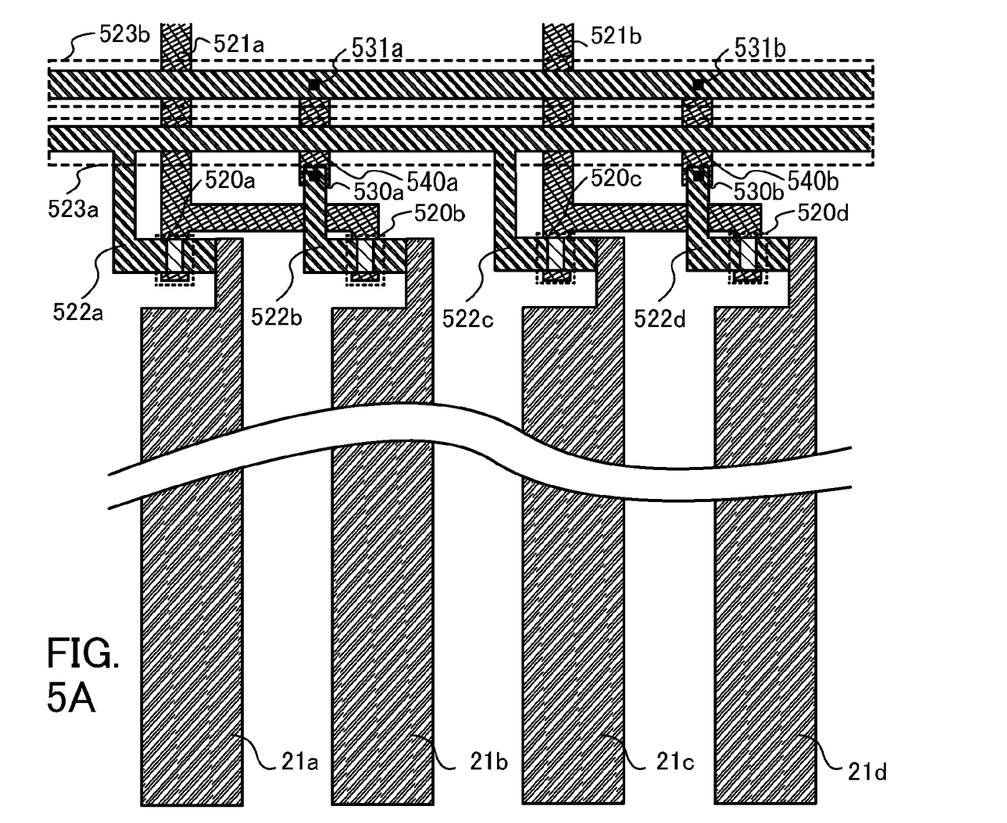
FIGS. 5A and 5B are diagrams illustrating one embodiment of a plurality of transparent electrodes in a striped pattern.
Figure 5B:
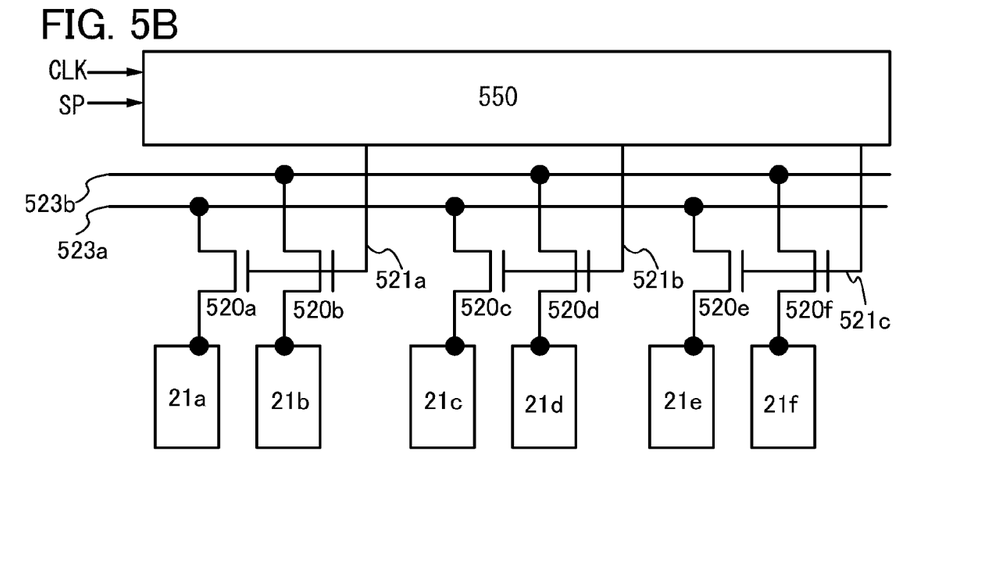

As illustrated in FIG. 5B, a potential is applied to each of the first transparent electrodes 21 (the transparent electrode 21a, the transparent electrode 21b, the transparent electrode 21c, the transparent electrode 21d, and the transparent electrode 21f are illustrated as representatives in FIG. 5B) through a transistor 520a, a transistor 520b, a transistor 520c, a transistor 520d, a transistor 520e, and a transistor 520f, respectively. A clock signal (referred to as "CLK" in FIG. 5B) and a start pulse (referred to as "SP" in FIG. 5B) are input to a shift register 550. Accordingly, the shift register 550 outputs selection pulses to a wiring 521a, a wiring 521b, and a wiring 521c sequentially. A transistor in which the selection pulse is input to its gate is turned on. In this manner, switching is performed on the transistor 520a, the transistor 520b, the transistor 520c, the transistor 520d, the transistor 520e, and the transistor 520f, so that signals input to a wiring 523a and a wiring 523b are sampled and predetermined potentials can be applied to the first transparent electrodes 21.

Note that the following structure is illustrated in FIG. 5A: two wirings (the wiring 523a and the wiring 523b) to which potentials applied to the first transparent electrodes 21 are input are provided, and different selection pulses are applied to the two wirings one of which is connected to sources or drains of transistors (here, the transistor 520a, the transistor 520c, and the transistor 520e) and the other of which is connected to sources or drains of transistors (here, the transistor 520b, the transistor 520d, and the transistor 520f). However, the number of wirings to which potentials applied to the first transparent electrodes 21 is input is not limited thereto and may be one or three or more. By an increase in the number of the wirings, the drive frequency of the shift register 550 can be reduced.

FIG. 5A is a top view of a more detailed example of the structure illustrated in FIG. 5B, except for the shift register 550. In FIG. 5A, the transparent electrode 21a, the transparent electrode 21b, the transparent electrode 21c, the transparent electrode 21d, the transistor 520a, the transistor 520b, the transistor 520c, and the transistor 520d are illustrated as representatives.

A gate of the transistor 520a is connected to the wiring 521a, one of a source and a drain of the transistor 520a is connected to a wiring 522a, and the other of the source and the drain of the transistor 520a is connected to the transparent electrode 21a. A gate of the transistor 520b is connected to the wiring 521a, one of a source and a drain of the transistor 520b is connected to a wiring 522b, and the other of the source and the drain of the transistor 520b is connected to the transparent electrode 21b. A gate of the transistor 520c is connected to the wiring 521b, one of a source and a drain of the transistor 520c is connected to a wiring 522c, and the other of the source and the drain of the transistor 520c is connected to the transparent electrode 21c. A gate of the transistor 520d is connected to the wiring 521b, one of a source and a drain of the transistor 520d is connected to a wiring 522d, and the other of the source and the drain of the transistor 520d is connected to the transparent electrode 21d.

The wiring 522a and the wiring 522c are electrically connected to the wiring 523a. Note that FIG. 5A shows an example where the wiring 522a, the wiring 522c, and the wiring 523a are formed using one conductive film. The wiring 522b and the wiring 522d are electrically connected to the wiring 523b. In FIG. 5A, the wiring 522b is connected to a wiring 540a through a contact hole 530a. The wiring 540a is also connected to the wiring 523b through a contact hole 531a. Further, the wiring 522d is connected to a wiring 540b through a contact hole 530b. The wiring 540b is also connected to the wiring 523b through a contact hole 531b.

Here, the wiring 522a, the wiring 522b, the wiring 522c, the wiring 522d, the wiring 523a, and the wiring 523b can be formed by etching of one conductive film. Further, the wiring 540a, the wiring 540b, the wiring 521a, and the wiring 521b can be formed by etching of one conductive film.

Note that the shift register 550 can be formed using a transistor formed over a substrate over which the plurality of first transparent electrodes 21 is formed. For example, the shift register 550 may be formed using a transistor having a structure similar to that of the transistor 520a, the transistor 520b, the transistor 520c, the transistor 520d, the transistor 520e, or the transistor 520f. Alternatively, the shift register 550 formed in an LSI chip may be formed over the substrate over which the plurality of first transparent electrodes 21 is formed, for example.

Further, a potential can be applied to each of the second transparent electrodes 22 through a corresponding transistor. Such a structure can be similar to that in FIGS. 5A and 5B; thus, description thereof is omitted.

Note that the above transistors (the transistor 520a, the transistor 520b, the transistor 520c, the transistor 520d, and the like in FIGS. 5A and 5B) may have extremely low off-state current. For example, a transistor in which a channel is formed in a layer formed using an oxide semiconductor may be used. When the above transistors have extremely low off-state current, potentials which are applied to the first transparent electrodes 21 and the second transparent electrodes 22 of the shutter panel 20 can be held for a long time. In this manner, in the case where the widths of and the space between the parallax barriers are invariable, frequency of inputting predetermined potentials to the first transparent electrodes 21 and the second transparent electrodes 22 of the shutter panel 20 through transistors can be reduced. Thus, the drive frequency of a driver circuit (the shift register 550 in FIG. 5B, for example) which drives the transistors can be reduced, or the operation of the driver circuit can be temporarily stopped, so that power consumption of a display device can be reduced.

An oxide semiconductor to be used preferably contains at least indium (In) or zinc (Zn). In particular, In and Zn are preferably contained. As a stabilizer for reducing changes in electric characteristics of a transistor including the oxide semiconductor, gallium (Ga) is preferably additionally contained. Tin (Sn) is preferably contained as a stabilizer. Hafnium (Hf) is preferably contained as a stabilizer. Aluminum (Al) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, indium oxide; tin oxide; zinc oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used.

Note that here, for example, an In—Ga—Zn-based oxide means an oxide containing In, Ga, and Zn as its main component, and there is no limitation on the ratio of In:Ga:Zn. Further, the In—Ga—Zn-based oxide may contain a metal element other than In, Ga, and Zn.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or any of oxides whose composition is in the neighborhood of the above compositions can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or any of oxides whose composition is in the neighborhood of the above compositions may be used.

However, the composition is not limited to those described above, and a material having an appropriate composition may be used depending on needed semiconductor characteristics (such as mobility, threshold voltage, and variation). In order to obtain needed semiconductor characteristics, it is preferable that the carrier density, the impurity concentration, the defect density, the atomic ratio of a metal element to oxygen, the interatomic distance, the density, and the like be set to appropriate values.

Note that for example, the expression "the composition of an oxide containing In, Ga, and Zn at the atomic ratio, In:Ga:Zn=a:b:c (a+b+c=1), is in the neighborhood of the composition of an oxide containing In, Ga, and Zn at the atomic ratio, In:Ga:Zn=A:B:C (A+B+C=1)" means that a, b, and c satisfy the following relation: $(a-A)^2+(b-B)^2+(c-C)^2 \leq r^2$, and r may be 0.05, for example. The same applies to other oxides.

The oxide semiconductor may be either single crystal or non-single-crystal. In the latter case, the oxide semiconductor may be either amorphous or polycrystalline. Further, the oxide semiconductor may have either an amorphous structure including a portion having crystallinity or a non-amorphous structure.

With the above structure, potentials of the first transparent electrodes 21 can be individually controlled and potentials of the second transparent electrodes 22 can be individually controlled. In this manner, the widths of and the space between the parallax barriers in the shutter panel 20 can be changed more freely (the range of widths of the parallax barriers and the range of the space between the parallax barriers can be extended).

This embodiment can be freely combined with any of the other embodiments.

(Embodiment 4)

In this embodiment, one embodiment of an application example of a display device according to the present invention will be described with reference to FIGS. 3A and 3B.

Figure 3A:
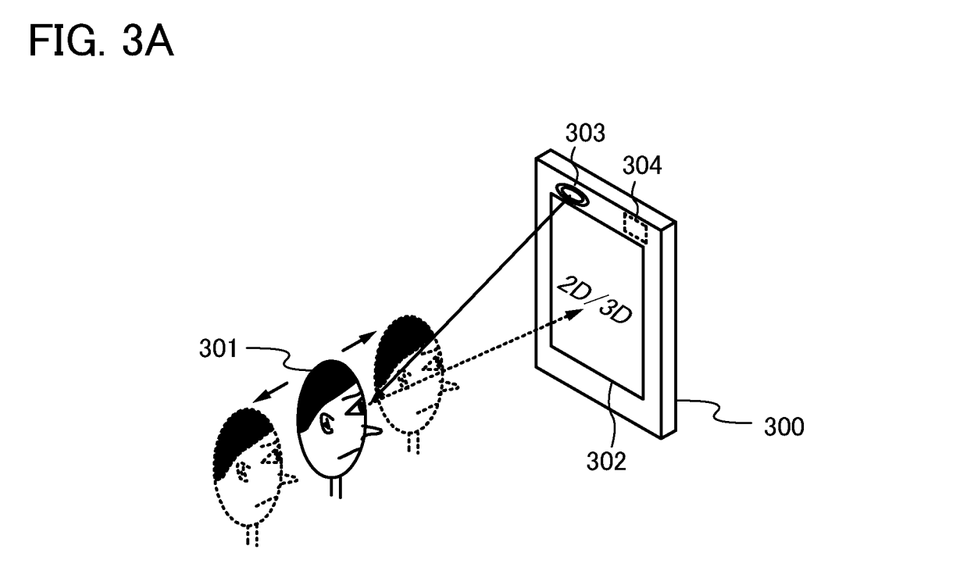
FIG. 3A is a diagram illustrating an application example of a display device.

FIG. 3A shows a display device 300 and a viewer 301. The display device 300 includes a distance sensor 303 and an angular sensor 304 in addition to a display portion 302 including the above-described display panel 10 and shutter panel 20. The distance sensor 303 and the angular sensor 304 are provided as means for measuring the distance between the display device 300 and the viewer 301, and shown as one structural example for measuring the distance.

The distance sensor 303 and the angular sensor 304, which are the measurement means, measure the distance between the display device 300 and the viewer 301. The distance between the display device 300 and the viewer 301 is preferably measured with high accuracy, for example, by a combination of distance detection by the distance sensor 303 such as an infrared sensor and angular detection by the angular sensor such as a gyro sensor. In the display device 300, the widths of the light-shielding regions 200 (the widths of the parallax barriers) in the shutter panel 20 are variable in accordance with the aforementioned distance. Thus, the display device in this embodiment can make the viewer perceive 3D display by generation of binocular parallax between the left eye and the right eye even if the viewer 301 looks at the display portion 302 without fixing the distance with the display device 300.

Figure 3B:
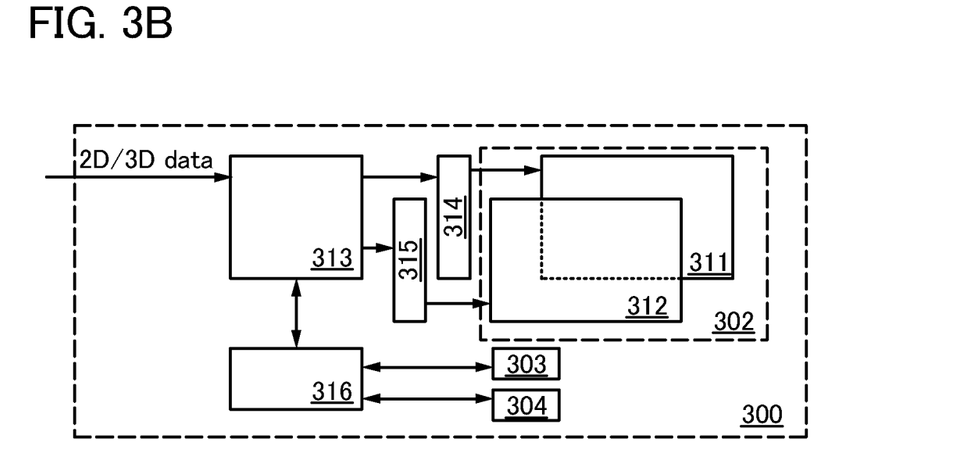
FIG. 3B is a block diagram of the display device.

FIG. 3B is a block diagram of the display device 300 including the distance sensor 303 and the angular sensor 304 described with reference to FIG. 3A. The display device 300 illustrated in the block diagram of FIG. 3B includes a display panel 311, a shutter panel 312, an application processor 313, a display panel control circuit 314, a shutter panel control circuit 315, and a sensor control circuit 316 in addition to the display portion 302, the distance sensor 303, and the angular sensor 304 described with reference to FIG. 3A.

The display panel 311 and the shutter panel 312 included in the display portion 302 are the display panel 10 and the shutter panel 20 described with reference to FIGS. 1A and 1B, which means that 3D images can be displayed even when the distance between the display device and the viewer is changed.

The sensor control circuit 316 can measure the distance between the display device and the viewer by the distance sensor 303 and the angular sensor 304. Data on the distance between the display device and the viewer, obtained by the sensor control circuit 316, is output to the application processor 313.

The application processor 313 is supplied with image data for 2D display or 3D display (expressed as "2D/3D data" in FIG. 3B) from the outside. The application processor 313 controls the display panel control circuit 314 in accordance with the image data supplied from the outside. The display panel control circuit 314 controls display of images on the display panel 311. The application processor 313 also controls the shutter panel control circuit 315 in accordance with data on the distance between the display device and the viewer, supplied from the sensor control circuit 316. The shutter panel control circuit 315 controls the shutter panel 312.

With the above-described structure in this embodiment, the range of distance with which the viewer can perceive a 3D image with the naked eye can be increased; thus, a highly convenient display device can be provided.

This embodiment can be implemented in appropriate combination with the structures described in the other embodiments.

EXAMPLE 1

The display device according to one embodiment of the present invention can be used for notebook personal computers and image reproducing devices provided with recording media (as typical examples, devices that reproduce the content of recording media such as digital versatile discs (DVDs) and have displays for displaying the reproduced images can be given). Other examples of electronic devices that can include the display device according to one embodiment of the present invention are mobile phones, portable game consoles, portable information terminals, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. In this example, specific examples of such electronic devices will be described with reference to FIGS. 6A to 6C.

Figure 6A:
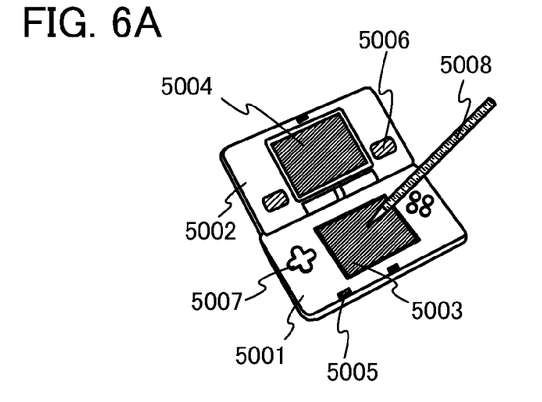
FIGS. 6A to 6C are diagrams each illustrating one embodiment of an electric device.

FIG. 6A illustrates a portable game console including a housing 5001, a housing 5002, a display portion 5003, a display portion 5004, a microphone 5005, a speaker 5006, an operation key 5007, a stylus 5008, and the like. The display device according to one embodiment of the present invention can be used for the display portion 5003 or the display portion 5004. By using the display device according to one embodiment of the present invention for the display portion 5003 or the display portion 5004, it is possible to provide a highly convenient portable game console capable of displaying 3D images. Although the portable game console in FIG. 6A has the two display portions 5003 and 5004, the number of display portions included in a portable game console is not limited to this.

Figure 6B:
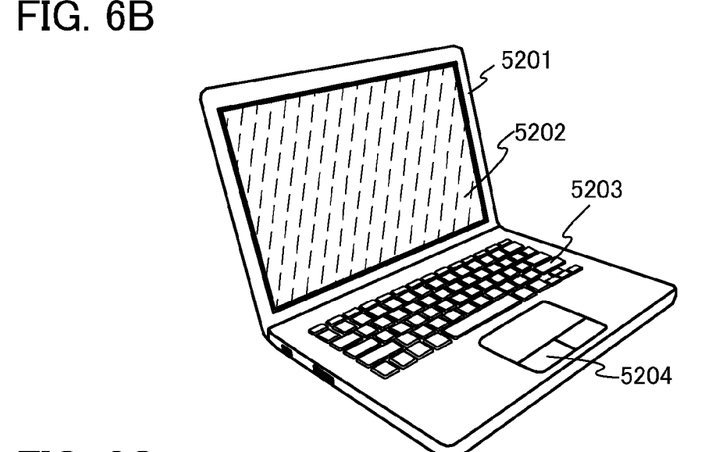

FIG. 6B illustrates a notebook personal computer including a housing 5201, a display portion 5202, a keyboard 5203, a pointing device 5204, and the like. The display device according to one embodiment of the present invention can be used for the display portion 5202. By using the display device according to one embodiment of the present invention for the display portion 5202, it is possible to provide a highly convenient notebook personal computer capable of displaying 3D images.

Figure 6C:
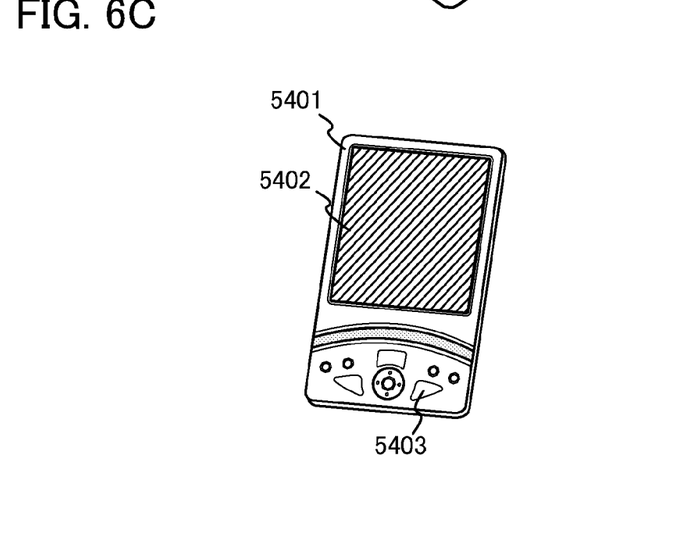

FIG. 6C illustrates a portable information terminal including a housing 5401, a display portion 5402, an operation key 5403, and the like. The display device according to one embodiment of the present invention can be used for the display portion 5402. By using the display device according to one embodiment of the present invention for the display portion 5402, it is possible to provide a highly convenient portable information terminal capable of displaying 3D images.

This example can be implemented in appropriate combination with the structures described in the other embodiments.

This application is based on Japanese Patent Application serial no. 2011-107031 filed with Japan Patent Office on May 12, 2011, the entire contents of which are hereby incorporated by reference.

What is claimed is:

1. A display device comprising:
   a display panel; and
   a shutter panel on a viewable side of the display panel,
   wherein the shutter panel comprises:
      a first substrate;
      a plurality of first transparent electrodes over the first substrate;
      a second substrate which faces the first substrate;
      a plurality of second transparent electrodes under the second substrate; and
      a liquid crystal between the first substrate and the second substrate,
   wherein the liquid crystal is between the plurality of first transparent electrodes and the plurality of second transparent electrodes,
   wherein the plurality of first transparent electrodes are arranged in a striped pattern in a first direction and spaced in a second direction which intersects the first direction,
   wherein the plurality of second transparent electrodes are arranged in a striped pattern in the first direction and spaced in the second direction,
   wherein the liquid crystal is between the second transparent electrodes,
   wherein potentials of the plurality of first transparent electrodes and potentials of the plurality of second transparent electrodes are controlled to adjust an alignment of the liquid crystal, so that the shutter panel comprises a plurality of light-shielding regions arranged in a striped pattern in the first direction and spaced in the second direction and a plurality of light-transmitting regions each of which is between the plurality of light-shielding regions, and wherein one of the second transparent electrodes overlaps the plurality of first transparent electrodes.

2. The display device according to claim 1, wherein a space between the plurality of first transparent electrodes overlaps with one of the plurality of second transparent electrodes and a space between the plurality of second transparent electrodes overlaps with one of the plurality of first transparent electrodes in a direction perpendicular to the first substrate or the second substrate.

3. The display device according to claim 1, wherein a potential is applied to each of the plurality of first transparent electrodes through a corresponding first transistor and a plurality of potential is applied to each of the second transparent electrodes through a corresponding second transistor.

4. The display device according to claim 1, wherein a side surface of one of the plurality of first transparent electrodes is in contact with the liquid crystal.

5. The display device according to claim 1, further comprising:
an orientation film.

6. The display device according to claim 1,
wherein the plurality of first transparent electrodes are configured to be applied with a first control signal;
wherein the plurality of second transparent electrodes are configured to be applied with a second control signal,
wherein each of the first control signal and the second control signal is a signal which alternates between a high potential and a low potential at regular intervals, and
wherein one control signal of the first and second control signals is the high potential when the other control signal of the first and second control signals is the low potential.

7. The display device according to claim 1,
wherein one of the plurality of first transparent electrodes is electrically connected to a transistor, and a gate electrode of the transistor is electrically connected to a shift register.

8. The display device according to claim 1,
wherein the liquid crystal fills a space between the plurality of first transparent electrodes, and
wherein the liquid crystal fills a space between the plurality of second transparent electrodes.

9. A method for driving a display device,
the display device comprising:
a display panel; and
a shutter panel provided on a viewable side of the display panel,
wherein the shutter panel comprises a first substrate, a plurality of first transparent electrodes provided over the first substrate, a second substrate which faces the first substrate, a plurality of second transparent electrodes provided under the second substrate, and a liquid crystal provided between the first substrate and the second substrate,
wherein the liquid crystal is between the plurality of first transparent electrodes and the plurality of second transparent electrodes,
wherein the plurality of first transparent electrodes are arranged in a striped pattern in a first direction and spaced in a second direction which intersects the first direction,
wherein the plurality of second transparent electrodes are arranged in a striped pattern in the first direction and spaced in the second direction, and
wherein potentials of the plurality of first transparent electrodes and potentials of the plurality of second transparent electrodes are controlled to adjust an alignment of the liquid crystal, so that the shutter panel is provided with a plurality of light-shielding regions arranged in a striped pattern in the first direction and spaced in the second direction and a plurality of light-transmitting regions each of which is provided between the plurality of light-shielding regions,
the method comprising:
applying a first control signal to the plurality of first transparent electrodes which forms the plurality of light-shielding regions; and
applying a second control signal to the plurality of second transparent electrodes which forms the plurality of light-shielding regions,
wherein each of the first control signal and the second control signal is a signal which alternates between a high potential and a low potential at regular intervals, and
wherein one control signal of the first and second control signals is the high potential when the other control signal of the first and second control signals is the low potential.

10. The method for driving a display device, according to claim 9,
wherein a third control signal is applied to the plurality of first transparent electrodes which forms the plurality of light-transmitting regions,
wherein a fourth control signal is applied to the plurality of second transparent electrodes which forms the plurality of light-transmitting regions, and
wherein the third control signal and the fourth control signal are a same signal.

11. A method for driving a display device,
the display device comprising:
a display panel; and
a shutter panel provided on a viewable side of the display panel,
wherein the shutter panel comprises a first substrate, a plurality of first transparent electrodes provided over the first substrate, a second substrate which faces the first substrate, a plurality of second transparent electrodes provided under the second substrate, and a liquid crystal provided between the first substrate and the second substrate,
wherein the liquid crystal is between the plurality of first transparent electrodes and the plurality of second transparent electrodes,
wherein the plurality of first transparent electrodes are arranged in a striped pattern in a first direction and spaced in a second direction which intersects the first direction,
wherein the plurality of second transparent electrodes are arranged in a striped pattern in the first direction and spaced in the second direction, and
wherein potentials of the plurality of first transparent electrodes and potentials of the plurality of second transparent electrodes are controlled to adjust an alignment of the liquid crystal, so that the shutter panel is provided with a plurality of light-shielding regions arranged in a striped pattern in the first direction and spaced in the second direction and a plurality of light-transmitting regions each of which is provided between the plurality of light-shielding regions, the method comprising:

applying a first control signal to the plurality of first transparent electrodes which forms the plurality of light-transmitting regions; and applying a second control signal to the plurality of second transparent electrodes which forms the plurality of light-transmitting regions, wherein each of the first control signal and the second control signal is a signal which alternates between a high potential and a low potential at regular intervals, and wherein one control signal of the first and second control signals is the high potential when the other control signal of the first and second control signals is the low potential.

12. The method for driving a display device, according to claim 11, wherein a third control signal is applied to the plurality of first transparent electrodes which forms the plurality of light-shielding regions, wherein a fourth control signal is applied to the plurality of second transparent electrodes which forms the plurality of light-shielding regions, and wherein the third control signal and the fourth control signal are a same signal.

13. A display device comprising:

a display panel; and a shutter panel on a viewable side of the display panel, wherein the shutter panel comprises:

a first substrate;

a plurality of first transparent electrodes over the first substrate;

a liquid crystal over the plurality of first transparent electrodes;

a plurality of second transparent electrodes over the liquid crystal; and a second substrate over the plurality of second transparent electrodes, wherein the plurality of first transparent electrodes are arranged in a striped pattern in a first direction and spaced in a second direction which intersects the first direction, wherein the plurality of second transparent electrodes are arranged in a striped pattern in the first direction and spaced in the second direction, wherein the liquid crystal is between the second transparent electrodes, wherein potentials of the plurality of first transparent electrodes and potentials of the plurality of second transparent electrodes are controlled to adjust an alignment of the liquid crystal, so that the shutter panel is provided with a plurality of light-shielding regions arranged in a striped pattern in the first direction and spaced in the second direction and a plurality of light-transmitting regions each of which is provided between the plurality of light-shielding regions, and wherein one of the second transparent electrodes overlaps the plurality of first transparent electrodes.

14. The display device according to claim 13, wherein a space between the plurality of first transparent electrodes overlaps with one of the plurality of second transparent electrodes and a space between the plurality of second transparent electrodes overlaps with one of the plurality of first transparent electrodes in a direction perpendicular to the first substrate or the second substrate.

15. The display device according to claim 13, wherein a potential is applied to each of the plurality of first transparent electrodes through a corresponding first transistor and a potential is applied to each of the plurality of second transparent electrodes through a corresponding second transistor.

* * * * *